United States Patent [19]
Cairo, Jr. et al.

[11] Patent Number: 5,591,347
[45] Date of Patent: Jan. 7, 1997

[54] SINGLE CELL GAS FLOTATION SEPARATOR WITH FILTER MEDIA

[75] Inventors: John A. Cairo, Jr.; John A. Young, both of Baton Rouge, La.

[73] Assignee: Unicel, Inc., Baton Rouge, La.

[21] Appl. No.: 604,800

[22] Filed: Feb. 23, 1996

Related U.S. Application Data

[63] Continuation-in-part of Ser. No. 451,145, May 26, 1995, Pat. No. 5,516,434.

[51] Int. Cl.⁶ .................................. C02F 9/00; C02F 1/24
[52] U.S. Cl. .................. 210/703; 210/712; 210/741; 210/744; 210/806; 210/108; 210/111; 210/196; 210/202; 210/221.2; 210/262; 210/266; 210/275; 210/277; 210/295
[58] Field of Search ................................ 210/703, 712, 210/741, 744, 806, 108, 111, 196, 202, 221.2, 262, 266, 275, 277, 295

[56] References Cited

U.S. PATENT DOCUMENTS

| | | |
|---|---|---|
| 3,433,359 | 3/1969 | Lundin . |
| 3,506,125 | 4/1970 | Willis . |
| 3,713,543 | 1/1973 | Heaney . |
| 3,905,890 | 9/1975 | Minegishi . |
| 3,977,970 | 8/1976 | Willis . |
| 4,094,783 | 6/1978 | Jackson . |
| 4,162,972 | 7/1979 | Green . |
| 4,289,628 | 9/1981 | Disselbeck . |
| 4,294,697 | 10/1981 | Sawa . |
| 4,377,485 | 3/1983 | Krofta . |
| 4,626,345 | 12/1986 | Krofta . |
| 4,673,494 | 6/1987 | Krofta . |
| 4,800,025 | 1/1989 | Bibaeff . |
| 4,981,582 | 1/1991 | Yoon . |
| 5,064,531 | 11/1991 | Wang . |
| 5,080,780 | 1/1992 | Canzoneri . |
| 5,080,802 | 1/1992 | Cairo . |
| 5,130,029 | 7/1992 | Suutarinen . |
| 5,156,745 | 10/1992 | Cairo . |
| 5,256,299 | 10/1993 | Wang . |
| 5,273,624 | 12/1993 | Chamberlain . |
| 5,320,750 | 6/1994 | Krofta . |
| 5,516,434 | 5/1996 | Cairo . |

FOREIGN PATENT DOCUMENTS

| | | |
|---|---|---|
| 3412217 | 10/1985 | Germany . |
| 4335104 | 6/1994 | Germany . |
| 1-242187 | 9/1989 | Japan . |
| 1381074 | 3/1988 | U.S.S.R. . |
| 1430353 | 10/1988 | U.S.S.R. . |
| 2263694 | 4/1993 | United Kingdom . |

OTHER PUBLICATIONS

Krofta device sales brochure Apr. 1994.

*Primary Examiner*—Thomas M. Lithgow
*Attorney, Agent, or Firm*—Phelps Dunbar

[57] ABSTRACT

A simplified single cell apparatus and method for removal of suspended impurities in liquids using gas flotation and filtration is provided wherein the method and apparatus are preferably directed to induced gas flotation separation of suspended impurities in combination with a filter media for filtration removal of remaining suspended impurities. A filter media is contained within the single cell apparatus such that liquid exiting the vessel must pass through the filter media after having been subjected to flotation treatment.

22 Claims, 3 Drawing Sheets

SINGLE CELL GAS FLOTATION SEPARATOR WITH FILTER MEDIA

This application is a continuation-in-part of applications Ser. No. 08/451,145 filed on May 26, 1995, now U.S. Pat. No. 5,516,434.

BACKGROUND OF THE INVENTION

The present invention relates to a method and apparatus for removing suspended matter from liquid. The method and apparatus of the present invention further relates to liquid-solids and/or liquid-liquid separation. More particularly, the present invention relates to a method and apparatus which separates suspended impurities from liquid through flotation of impurities using gas bubbles, followed by filtration of the liquid, within a single cell treatment vessel.

Multiple industries including oil, paper and pulp, textiles, electricity generating and food processing present an ever present and growing problem of contaminated liquids, especially water as a by product of the various processes; in particular, water produced in the oil and gas industry, and waste water streams in the paper and pulp industry. A method commonly used to separate oil and suspended material from water and other liquids is the gas flotation separator.

U.S. Pat. Nos. 5,080,802 and 5,156,745 provide single cell induced gas flotation separators. In practice these devices are often used in conjunction with wholly separate filtration systems. The filtration process is used to remove any impurities that remain in the liquid effluent of the flotation separator. A filtration process alone would often be inadequate to treat the liquid stream being treated by the flotation separator, but is effective in "polishing" the flotation separator effluent. However, use of a wholly separate filtration system can result in expensive and wasteful duplication of equipment. Two vessels may be required—one for floatation, and a second vessel for filtration. An additional pump or pumps may be required, to create adequate liquid flow through a wholly separate filtration system. Additional piping to connect the flotation device and filtration device is needed.

Many flotation separators are used in remote locations or in locations with severe space limitations. For example, use of flotation separators in the oil and gas industry, particularly on offshore production platforms, can be impacted by space limitations. Use of wholly separate filtration systems exacerbates such problems. Transportation of filtration equipment to remote locations and maintenance of such equipment adds expense to the liquid treatment process.

The present invention provides an apparatus and method for treating contaminated liquids using gas flotation followed by filtration in a single cell vessel. This approach resolves the problems inherent in the use of wholly separate filtration systems in conjunction with flotation separators. A single cell vessel houses both the flotation means and the filtration means employed in the present invention. Use of a single cell vessel not only reduces the space required for the flotation and filtration treatment equipment, but also reduces the total cost involved in obtaining, maintaining, and using such equipment, since duplication of equipment is eliminated.

SUMMARY OF THE INVENTION

The apparatus and method of the present invention provides a system which solves the problems inherent in having distinct flotation and filtration separation devices. What is provided is a single cell vessel which houses both the flotation zone of an induced gas flotation separator, and the filter media through which liquid effluent from the flotation process must pass in order to exit the single cell vessel. The single cell vessel may be of various configurations, preferably capable of withstanding virtually any industrial pressure requirement. The vessel defines a chamber which is in communication with an inlet for receiving influent liquid which has passed through an eductor means for inducing gas into the influent. The vessel chamber provides means for maintaining a liquid level into which the gas induced influent is released. The release point is generally below the liquid level of the contained liquid and a removal means is presented for froth skimming and discharge. A trough is located in the upper portion of the vessel for receiving and removing froth laden impurities which have accumulated on the liquid surface. The chamber is in communication with an outlet means in a lower portion thereof for discharging clarified liquid. Between the location of the influent inlet and the clarified liquid outlet is the filter media. In order for the flotation process effluent to reach the discharge outlet it must pass through the filter media. Various filter media may be utilized, including a layer of sand or other similar material. The preferred filter media will depend upon the characteristics of the liquid being treated and the quantity and characteristics of the impurities therein. Where a layer of filter media is utilized, a piping arrangement located in the lower portion of the filter media bed provides for collection of the filtered liquid and directs the collected filtered liquid to the discharge outlet. The collection piping has numerous small openings which allow for entry of the liquid being filtered into the pipe, but which do not allow passage of filter media into the pipe. Alternatively, a number of cartridge-type filter elements may be located in the lower section of the vessel. Each of the cartridge type filter elements is attached to a piping arrangement whereby liquid being filtered passes through the cartridge filter element and into the piping arrangement and is directed to the discharge outlet.

Pressurizing the vessel may be required or desirable to increase the rate of liquid passing through the filter media. Vessels sized for a certain flow rate based upon flotation requirements may be too small to contain the required filtration area to support that flow rate, using only the liquid head as the force to drive the liquid through the filter bed. Increasing the pressure within the vessel increases the flow through the filter bed, without adverse impact on the flotation process. Accordingly, in certain applications, pressurization will be required to prevent the need for a larger vessel to accommodate additional filtration area.

Means are provided to periodically clean the filter media. Such cleaning is generally accomplished by flowing gas through the filter media in the direction opposite the direction of fluid flow during filtration. In this manner particles trapped in the filter media are dislodged. Following treatment with gas, the filter media is "backwashed" with clean liquid in order that the dislodged particles may be removed from the vessel. A vessel outlet for backwash liquid is provided above the level of the filter media.

It is therefore an object of the present invention to provide an improved method and apparatus for removing suspended matter from liquid utilizing a single cell vessel which houses the flotation zone of an induced gas flotation separation process and which also houses a filter media for polishing the liquid after flotation treatment. The single cell vessel can be fabricated to withstand internal pressure requirements and does not vent or leak potentially life threatening and/or explosive vapors to the atmosphere. The method and apparatus according to the invention utilizes a piping arrangement for removal of filtered liquid from the single cell vessel, and also provides for periodic cleaning of the filter media.

BRIEF DESCRIPTION OF THE DRAWINGS

While the specification concludes with claims particularly pointing out and distinctly claiming the subject matter that is regarded as forming the present invention, it is believed that the invention would be better understood from the following description accompanied by the following figures, FIGS. 1–3, wherein the figures present an overall presentation of the apparatus according to the invention. However, the specific means as shown in the figures are not deemed to be limiting since other suitable means can be substituted for the various portions thereof.

DETAILED DESCRIPTION OF THE INVENTION

Figure 1:
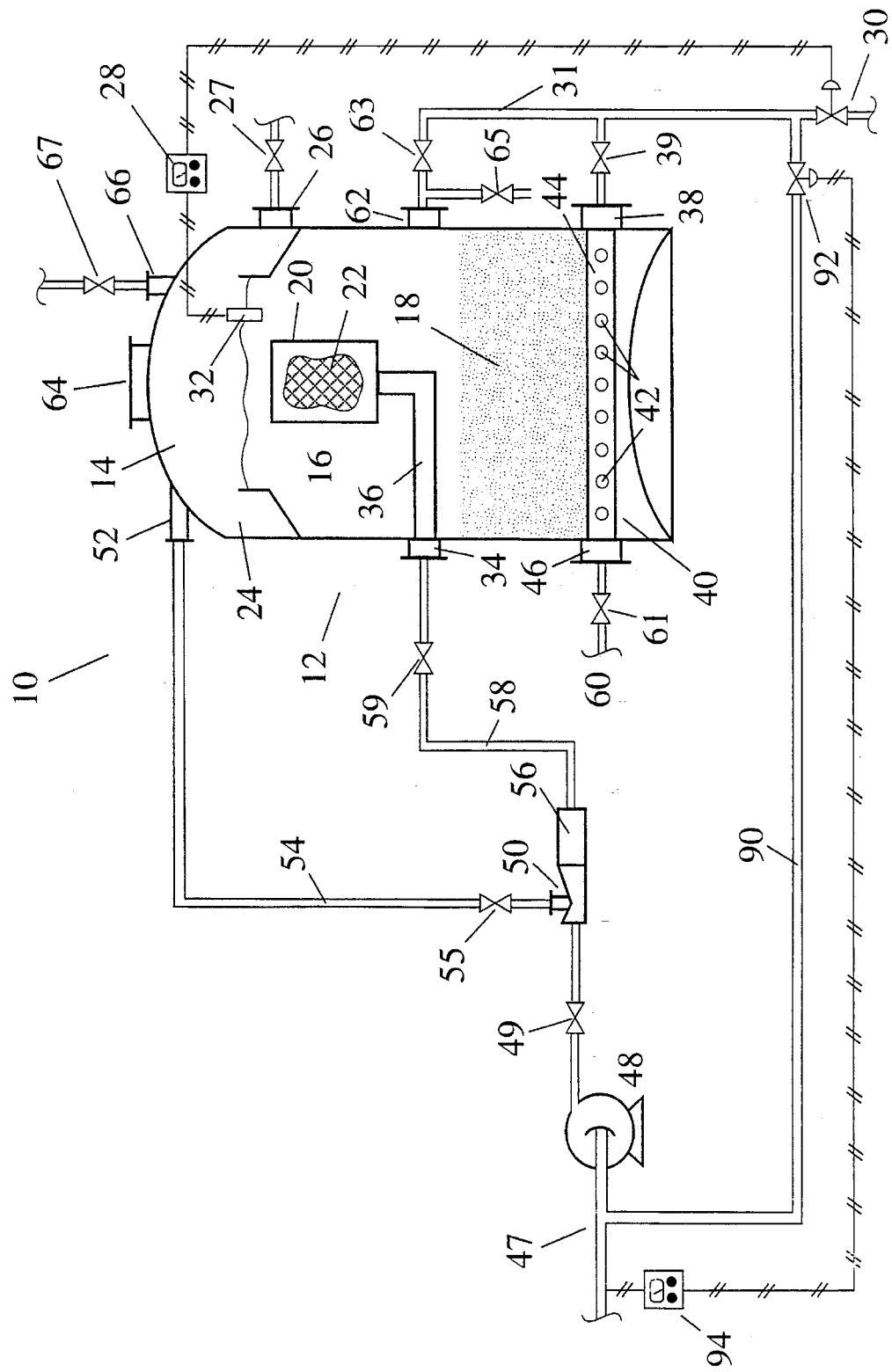
FIG. 1 presents a partial schematic and partial cross-sectional side view of the apparatus according to the invention.

The apparatus of the present invention as illustrated in FIG. 1 is generally indicated as a single cell flotation/filtration apparatus 10 with the apparatus being dominated by a single cell separator vessel 12. As illustrated in the figures, the single cell separator vessel 12 can be a substantially elongated vertical cylindrical vessel designed to withstand both positive and negative pressures. The separator vessel 12 defines three primary sections. The uppermost of these sections is the gas vapor section 14. Below the gas vapor section 14 is the induced gas flotation section 16. Below the induced gas flotation section 16 is the filter media section 18. Within the induced gas flotation section 16, a riser tube 20 is located and is in open communication with the liquid contained in the induced gas flotation section 16, at or below the liquid surface. Within the riser tube 20 a coalescer pack 22 is positioned in order to insure final coalescence of influent contaminants. Alternatively, the coalescer means may be placed at different locations within the separator vessel 12, outside of the riser tube. The coalescer means must be positioned below the liquid level within the vessel, but above the release point of the gas induced influent into the induced gas flotation section 16. Coalescer means may be any of numerous materials known in the art that present surface area for encouragement of coalescence of suspended impurities.

A froth discharge trough 24 circumferentially surrounds the upper inside perimeter of the separator vessel 12 and is in open communication with gas vapor section 14. Coalescer discharge froth is collected in the froth discharge trough 24 and discharged from the trough 24 through froth outlet 26. A liquid level control device 28 is shown in the figures which provides a method of maintaining liquid level within the vessel 12. The liquid level control device 28 controls clarified liquid outlet valve 30 based upon a signal from liquid level sensor 32. Alternatively, a mechanical method of liquid level control may be utilized, such as by use of an adjustable length standpipe (not shown) which may be mounted externally to the separator vessel 12. Froth is generated by the aeration and coalescence of impurities which have passed through the riser tube 20 and coalescer pack 22. The upper end of the riser tube 20 can be positioned in several heights in relationship to the liquid level, depending upon the geometry of the vessel 12, the riser tube 20, and the throughput volumes of gas induced influent, but is always at or below the liquid level.

Gas induced influent is introduced into the vessel 12 via influent inlet 34. Conduit 36 connects the influent inlet 34 with the bottom of the riser tube 20, which is centrally located with vessel 12. Clarified liquid is removed from the vessel 12 via effluent outlet 38. In order to reach effluent outlet 38, liquid must pass through filter media section 18. In FIG. 1 filter media section 18 is comprised of a filter bed of sand or similar material. Various materials comprised of small particles may make suitable filter media material, including anthracite, garnet, activated carbon, or crushed walnut shells, for example. Which material is best for a certain application will depend upon the characteristics of the liquid being treated, and the nature of the impurities being filtered out of the liquid. At the bottom of vessel 12 and filter media section 18 is located filtrate collection system 40. Collection system 40 comprises an arrangement of filtrate permeable pipe 42 spread across the floor of vessel 12. Each piece of filtrate permeable pipe 42 is connected to a header conduit 44 which is in turn connected to effluent outlet 38. Filtrate permeable pipe 42 allows passage of filtered liquid into the pipe 42 while preventing passage of filter media material into pipe 42. The end of header conduit 44 not connected to effluent outlet 38 is connected to cleaning material inlet 46, which is in turn connected to cleaning material source line 60. Alternatively, the header may be connected to only one opening in vessel 12 which could serve as effluent outlet and cleaning material inlet, through appropriate valving (not shown).

Influent pump 48 provides liquid to be treated to the gas injection eductor assembly 50. Flow of liquid through the gas injection eductor assembly 50 causes gas from gas vapor section 14 to be drawn into the liquid stream via gas vapor section outlet 52 and gas suction pipe 54. A gas-liquid static mixer 56 downstream from the gas injection eductor assembly 50 brings together under energized conditions the gas-liquid mixture in a manner which provides a highly gasifier liquid fluid flow and uniform small bubble diameter. The gas induced influent is directed to influent inlet 34 by influent feed conduit 58.

Vessel 12 is equipped with an auxiliary effluent outlet 62 which may be used to lower liquid level in the vessel 12 prior to cleaning of the filter media section 18, or may also be used to operate the apparatus in the flotation mode only, bypassing the filter media section 18. Vessel 12 may also be equipped with a flanged manway opening 64 to provide for access to the interior of the vessel 12 as needed. One or more additional manway openings (not shown) may be provided on the side of vessel 12 to facilitate access to the filter media section 18. Operating pressure and gas volume requirements for the flotation process may be maintained by regulating gas provided to gas supply nozzle 66.

Figure 2:
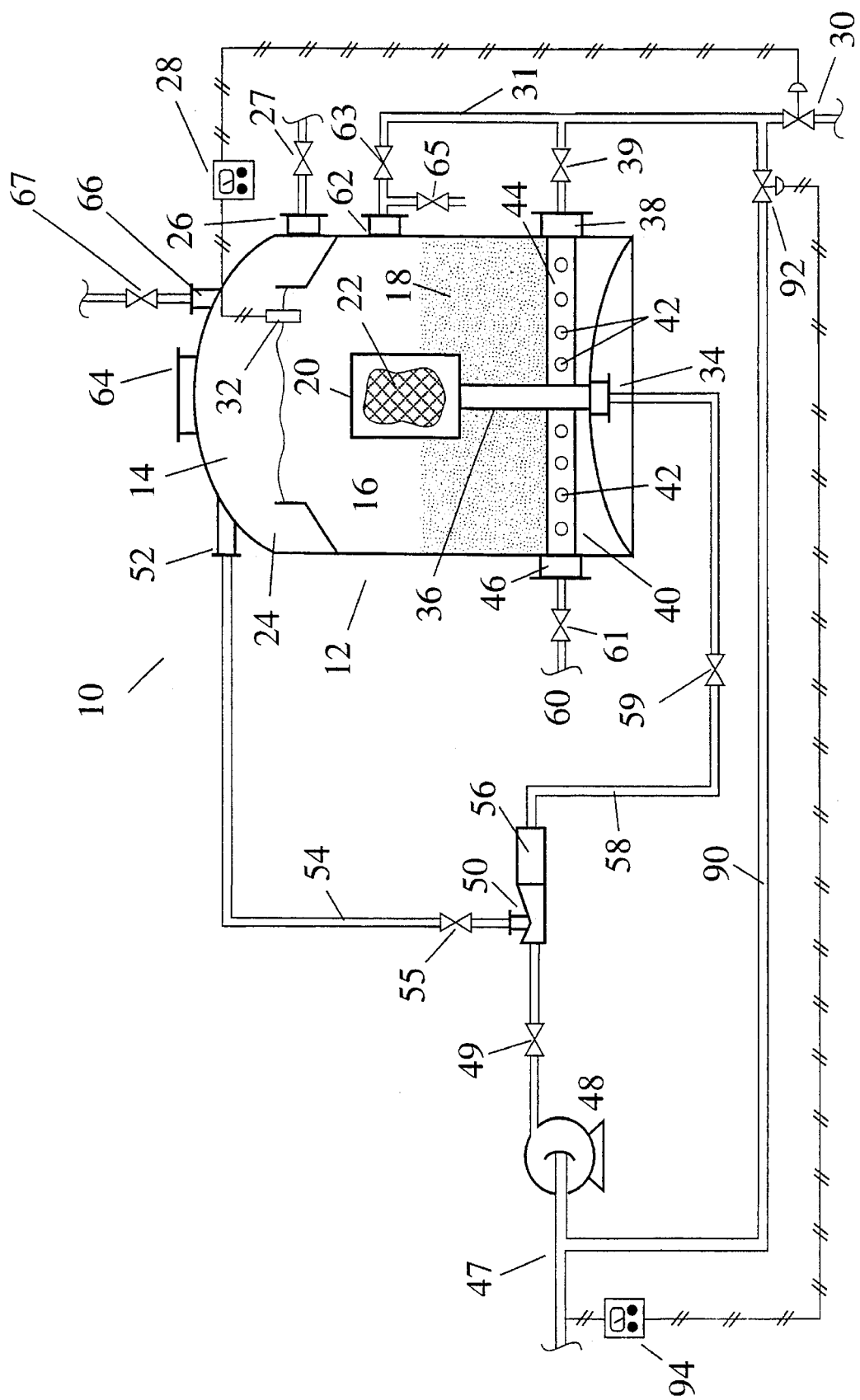
FIG. 2 presents a partial schematic and partial cross-sectional side view of an alternative embodiment of the invention wherein the riser/coalescer tube is partially surrounded by the filter media and the influent enters the vessel from the bottom of the vessel.

In FIG. 2 a slightly different configuration is presented. In this configuration the influent inlet 34 is moved to the bottom of the vessel 12, and the riser tube 20 is in part surrounded by the filter media section 18. Riser tube 20 may be narrowed near the bottom of vessel 12 to minimize interference with filtrate collection system 40. For certain applications this configuration may reduce the overall height of vessel 12 without reducing performance.

Figure 3:
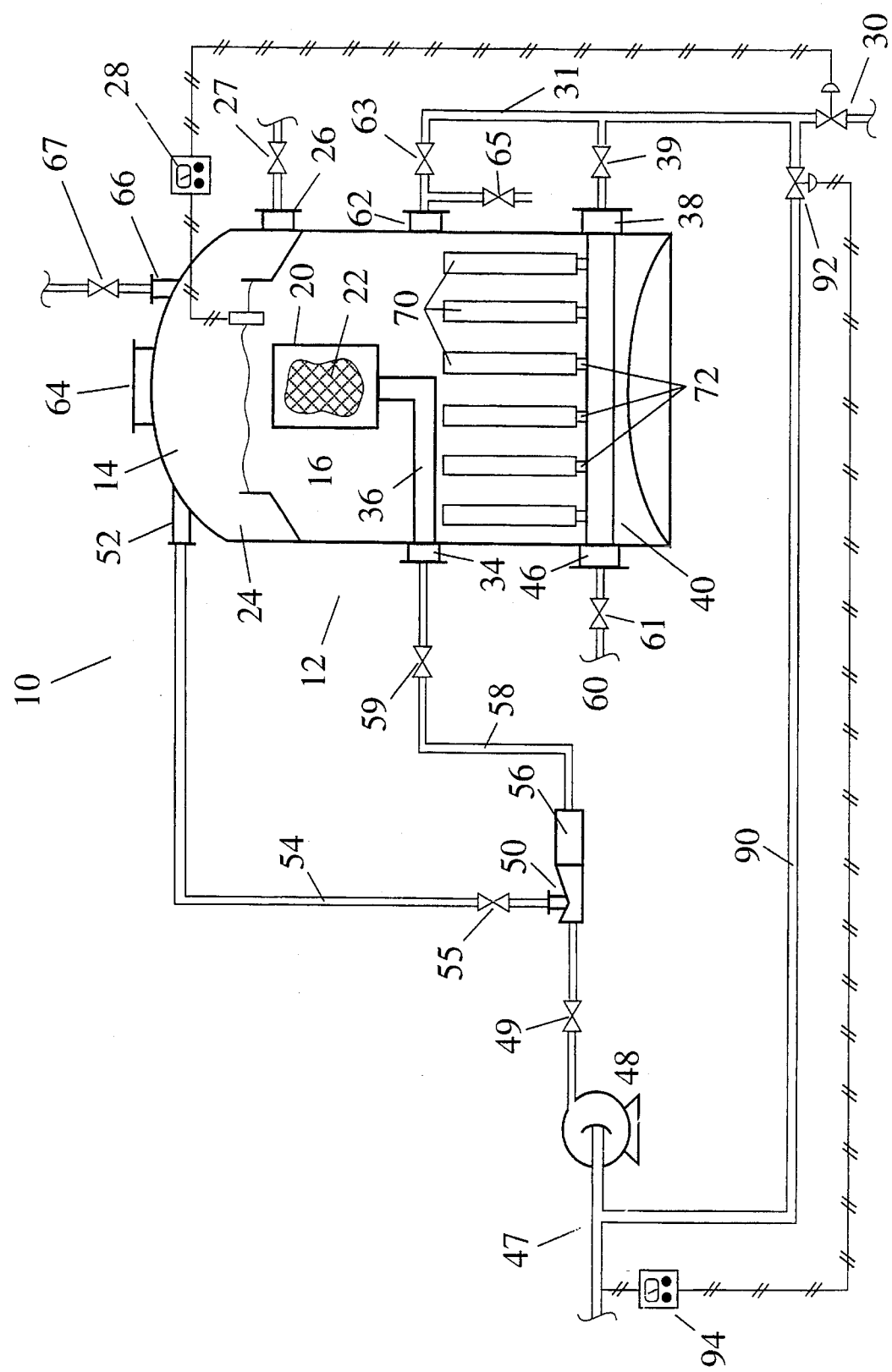
FIG. 3 presents a partial schematic and partial cross-sectional side view of an alternative embodiment of the invention wherein the filter media comprises a plurality of filter cartridge elements.

In FIG. 3 a different filter media is presented. Instead of a filter media comprised of sand or other particulate material, a plurality of cartridge filters 70 are utilized. The lower end of each cartridge filter 70 is connected to collection system 40. The collection system pipe 72 in this embodiment is not filtrate permeable.

The apparatus may also be equipped with a mechanical skimmer assembly (not shown) in the gas vapor section 14 of the vessel 12. The function of the skimmer assembly is to push the froth from the liquid surface in the vessel 12 into the trough 24 on a continuous basis. The skimmer assembly may further encourage the froth towards the froth outlet 26.

In use, the liquid stream to be treated is pressurized by influent pump 48 and is pumped through eductor inlet valve 49. Eductor inlet valve 49 may be used to regulate the flow of liquid into the vessel 12. The liquid stream then passes through gas injection eductor assembly 50. The passage of the liquid through the eductor assembly 50 causes gas to be drawn into the eductor assembly 50. The gas is drawn from the gas vapor section 14 of the vessel 12 through gas section vapor outlet 52 via gas suction line 54. Gas suction line valve 55 may be used to regulate gas flow to the eductor assembly 50. The gas-liquid mixture then passes through the static mixer 56 which causes shearing of gas bubbles resulting in decreased gas bubble size, and increased gas bubble uniformity. The resulting small and uniform gas bubbles provide massive surface area for interaction with suspended impurities during the flotation process. Gas induced liquid flows from the static mixer 56 to influent inlet 34 via influent feed conduit 58. Influent feed conduit valve 59 provides for additional regulation of influent feed rates, and for isolation of vessel 12 as needed. Gas induced liquid flows from influent inlet 34 to riser tube 20 via conduit 36. Upon reaching the riser tube 20, liquid velocity is substantially reduced due to the increased diameter of the riser tube 20. However, in certain embodiments the riser tube 20 and the conduit 36 may be of the same diameter and constitute a single continuous conduit, particularly in those embodiments which place the coalescer means outside of the riser tube 20. Passage of the gas induced liquid through the riser tube 20 and coalescer pack 22 at reduced velocity affords maximum coalescence of suspended impurities. Effervescent liquid flowing upward through riser tube 20 leaves the riser tube 20 at or near the surface of the liquid contained in vessel 12. Alternatively the coalescer means may be located at other locations within the vessel, rather than within the riser tube 20. For example, coalescer means may be located above the outlet of the riser tube 20 and occupy all or part of the inside diameter of the vessel 12. In such embodiments the release point of gas induced influent from the riser tube 20 may be farther removed from the surface of the liquid in the vessel 12.

The liquid level in the vessel 12 is controlled by liquid level control device 28 which receives a signal from liquid level sensor 32, and sends a signal to clarified liquid outlet valve 30. As sensor 32 senses excessive liquid level in vessel 12, liquid level controller 28 causes liquid outlet valve 30 to partially open. If liquid levels decrease too much, liquid level controller 28 causes liquid outlet valve 30 to partially close. Liquid level should be maintained above the upper end of the riser tube 20, but below the level of the froth discharge trough 24. Liquid level may be periodically adjusted in order to encourage froth into the trough 24.

While it is not desirable to allow the liquid level to reach the lip of trough 24, allowing the liquid level to periodically reach a level of one or two inches below the lip of trough 24 will facilitate froth flow into the trough 24. This process is referred to as a skim cycle and may be initiated and controlled by a timer signal operating in conjunction with liquid level controller 28.

During normal operation the only liquid outlet from the vessel 12 is through effluent outlet 38. Accordingly, to reach effluent outlet 38, liquid must pass through filter media section 18. Remaining suspended impurities are filtered out of the liquid by the filter media. Upon reaching the bottom of the filter media section 18 the filtered liquid passes into filtrate permeable pipe 42, and then on to header conduit 44. Header conduit 44 directs the filtered liquid to effluent outlet 38 and the now clarified liquid leaves the vessel 12. At times if may be necessary or desirable to operate the apparatus without using the filtration process. To effect such operation filter isolation valve 39 is closed, and auxiliary outlet valve 63 is opened, resulting in liquid flow through auxiliary effluent outlet 62, above the filter media section 18. Both effluent outlet 38 and auxiliary effluent outlet 62 are connected to liquid outlet valve 30 via effluent outlet line 31.

Optimum performance of both the flotation and filtration processes is achieved by maintaining constant liquid flow velocities through the vessel 12. However, for many applications, the source of the liquid to be treated does not provide consistent flow rates. Accordingly, the apparatus is provided with a recirculation loop which provides make-up liquid as needed to maintain constant liquid flow velocities. The recirculation loop includes a recirculation line 90 which connects the effluent outlet line 31 (upstream of the liquid outlet valve 30) with the pump suction line 47 of influent pump 48. Recirculation valve 92 located within recirculation line 90 is controlled by recirculation rate controller 94, which senses the pressure on pump suction line 47, and opens or closes recirculation valve 92 as needed to maintain adequate liquid flow to the influent pump 48.

In many applications, the vessel size required to achieve the desired flow rate through the flotation aspect of the system will be insufficient to support adequate flow rates through the filtration aspect of the system, unless the vessel is pressurized. Increasing the pressure within the vessel will increase the rate of liquid passing through the filter bed, but will not adversely impact flotation performance at moderate pressures. Accordingly, means to pressurize the vessel will be required in such applications to avoid the need for increased vessel size to accommodate additional filtration area.

Cleaning of the filter media may be periodically required. The cleaning operation may be initiated on a time cycle, or based upon a pressure differential across the filter media, or based upon loss of clarity of the effluent liquid, or any combination of these parameters. The cleaning of the filter media is performed by a series of steps. First the influent pump 48 is stopped, and the vessel 12 isolated by the closure of filter isolation valve 39, auxiliary outlet valve 63, influent feed conduit valve 59, effluent outlet valve 30, gas suction line valve 55, trough outlet valve 27, and gas supply nozzle valve 67. Liquid level in the vessel 12 is then lowered to a level above the filter media section 18 by draining liquid out of the auxiliary outlet 62. A drain valve 65 is provided to facilitate removal of liquid through the auxiliary outlet 62. Drained liquid may be routed to the source of the liquid to be treated. Air or other scouring gas is then supplied from cleaning material source 60 to header conduit 44 via cleaning material inlet 46 by opening cleaning material valve 61.

Pressure in the vessel 12 may be regulated during the draining of liquid from the vessel or during the air scour of the filter media by opening the trough outlet valve 27 if needed. Flow of air or other gas into the filter media breaks up and dislodges embedded particulates. After completion of the air or gas scour, the filter media is flushed with water or other liquid to remove the dislodged particulates. The trough outlet valve 27 is fully opened. Clean water or other clean liquid is supplied from the cleaning material source 60 to header conduit 44 via cleaning material inlet 46. The flow rate of the flush liquid should be greater than the process filtration flow rate, which may necessitate a flush liquid pump (not shown). The flow of flush liquid is maintained for a period of time sufficient to cause dislodged particles to flow upward into the trough 14 and out of the vessel 12 via froth outlet 26. Alternatively, drain valve 65 may be opened and flush liquid may exit vessel 12 via auxiliary outlet 62. When the cleaning of the filter media is completed, the valving is reset to its operational configuration and the influent pump 48 restarted to resume flotation/filtration treatment of contaminated liquids.

Use of cartridge filters, as shown in FIG. 3, provides for the opportunity to precoat the filter elements to better remove contaminate particles. Prior to initiating a cycle of flotation and filtration of contaminated liquid, a mixture of filter aid and clean liquid should be flowed through the vessel 12 in the same manner as if treating contaminated liquid, except that the gas suction line valve 55 should be closed so that no gas is induced into the filteraid/clean liquid mixture. This mixture should then be recycled through the vessel 12 using the recirculation line 90 until the effluent is clear. In this manner the filter aid is deposited as a pre-coat on the cartridge filter elements. Cleaning of the cartridge filters occurs in the same manner as that set forth above for a filter media bed, although cleaning of cartridge filters generally requires less flush with clean liquid than does a filter bed. Cartridge filters with permanent elements (usually metallic or plastic) will generally be used for most applications. Cartridge filters with replaceable filter elements may be used, but will require entry into vessel 12 via a manway to replace clogged or dirty filter elements.

The single cell gas flotation separator with filter media apparatus 10 may be skid mounted and sized, for example, for processing 100 gallons per minute of influent. Such a system would typically consist of a separator vessel 12 being about 3 feet in diameter and about 7 feet in height. Capacity can be expanded by the addition of one or more separation vessels of various size, and splitting the influent stream between separators. In larger systems it may be desirable to use pressurized gas or air rather than an eductor assembly 50 to induce air or gas into the liquid stream to be treated. However, even when pressurized gas or air is utilized, the static mixer 56 is still required to disperse the induced air or gas into the desired smaller bubbles.

Although the present invention has been described in connection with preferred forms thereof, it will be appreciated that additions, modifications, substitutions, and deletions may be made without departing from the spirit and scope of the invention.

We claim:

1. An apparatus for removing suspended particles from liquids by coalescing, flotation and filtering, comprising:

a vessel defining a single chamber, said vessel having inlet and outlet means;

means for introducing liquid containing suspended particles into said vessel via said inlet means;

means for inducing gas into said liquid containing suspended particles;

at least one riser tube located in the chamber defined by said vessel, said riser tube having an upper end in open communication with liquid contained in the chamber defined by said vessel;

coalescer means located within the chamber defined by said vessel and positioned above the upper end of the at least one riser tube;

means for introducing the gas-induced liquid containing suspended particles into said at least one riser tube;

liquid level control means for maintaining and changing the liquid level in said vessel;

means in an upper portion of the chamber defined by said vessel for collection and removal of a particle-laden froth from the surface of the liquid;

means for removal of particle-laden froth from said vessel;

means for collecting gas from the upper portion of the chamber defined by said vessel and means for recirculation of said gas to said means for inducing gas;

filtration means located within the chamber defined by said vessel for filtering liquid after the liquid exits said riser tube and after the liquid is subjected to flotation;

means for periodically cleaning said filtration means of filtered particles;

means for removing liquid from a lower portion of the chamber defined by said vessel via said outlet means, after the liquid has been treated by said filtration means.

2. The apparatus according to claim 1 wherein said vessel defining a single chamber is gas tight, is substantially in the shape of a cylinder, and is vertically oriented, providing an upflow separator for removing suspended impurities from gas induced liquids.

3. The apparatus according to claim 1 wherein the means for inducing gas into said liquid containing suspended particles is comprised of a gas-liquid injector jet assembly and a flow through gas-liquid static mixer.

4. The apparatus according to claim 1 wherein the means for collection and removal of particle-laden froth from the surface of the liquid comprises a trough in contact with the upper portion of said vessel, said trough having at least one exit means extending to the exterior of said vessel, whereby froth on the surface of the liquid periodically enters said trough and exits said vessel through said exit means.

5. The apparatus according to claim 1 wherein there is only one of said at least one riser tubes, and said riser tube is positioned substantially coaxially with the axis of the chamber defined by said vessel.

6. The apparatus according to claim 1 wherein said filtration means comprises a bed of filter media in the lower portion of said vessel defining a single chamber.

7. The apparatus according to claim 6 wherein said bed of filter media is comprised of sand, anthracite, garnet, activated carbon, or walnut shells.

8. The apparatus according to claim 1 wherein said filtration means comprises at least one cartridge filter in the lower portion of said vessel defining a single chamber.

9. The apparatus according to claim 8 wherein said at least one cartridge filter is metallic and does not require the use of replaceable filter elements.

10. The apparatus according to claim 1 wherein said means for periodically cleaning said filtration means of filtered particles comprises means for backflushing said filtration means with clean liquid.

11. The apparatus according to claim 10 wherein said means for periodically cleaning said filtration means of filtered suspended particles further comprises means for scouring said filtration means with gas.

12. The apparatus according to claim 6 wherein said means for removing liquid comprises:

piping located adjacent the bottom of said bed of filter media, said piping being permeable to the liquid being treated but impermeable to said bed of filter media;

a header conduit connected to said piping and to said vessel outlet means.

13. The apparatus according to claim 8 wherein said means for removing liquid comprises:

a header conduit connected to said at least one cartridge filter and to said vessel outlet means.

14. The apparatus according to claim 1, further comprising means to pressurize said vessel, whereby flow through said filtration means is encouraged.

15. The apparatus according to claim 1, wherein said coalescer means is located between the upper end of said at least one riser tube and below the liquid level in said vessel.

16. A method for removing suspended particles from liquids, comprising;

providing a vessel defining a single chamber, said vessel having inlet and outlet means for fluid flow, at least one riser tube located in the chamber defined by said vessel, said riser tube having an upper end in open communication with liquid contained in the chamber defined by said vessel, and coalescer means located within the chamber defined by said vessel and being positioned above the upper end of the at least one riser tube;

inducing gas into said liquid to be treated via means for inducing gas;

introducing the liquid to be treated into said vessel via said inlet means;

introducing the gas-induced liquid containing suspended particles into said at least one riser tube;

contacting at least a portion of the gas-induced liquid to be treated with said coalescer means;

floating the suspended particles to a collection zone in an upper portion of said vessel;

removing particle-laden froth from said vessel;

collecting gas from the upper portion of the chamber defined by said vessel and recirculating said gas to said means for inducing gas;

controlling the liquid level in said vessel;

filtering the liquid through filter means located within said vessel, after the suspended particles have been floated to a collection zone;

periodically cleaning the filter means by backflushing said filter means with clean liquid;

withdrawing the resulting clarified liquid from said vessel via said outlet means.

17. The method according to claim 16 wherein the step of filtering the liquid is achieved by passing the liquid through a bed of filter media in the lower portion of the chamber.

18. The method according to claim 16 wherein the step of filtering the liquid is assisted by pressurizing said vessel.

19. The method according to claim 17 wherein said bed of filter media is comprised of sand, anthracite, garnet, activated carbon, or walnut shells.

20. The method according to claim 16 wherein the step of filtering the liquid is achieved by passing the liquid through at least one cartridge filter in the lower portion of the chamber.

21. The method according to claim 20 wherein said at least one cartridge filter is of the metallic variety not requiring replaceable filter elements.

22. The method according to claim 16 wherein the step of periodically cleaning said filter means further comprises scouring said filter means with gas.

* * * * *